March 30, 1954     B. W. COLMAN     2,673,806
POPCORN PACKAGE
Filed May 19, 1953
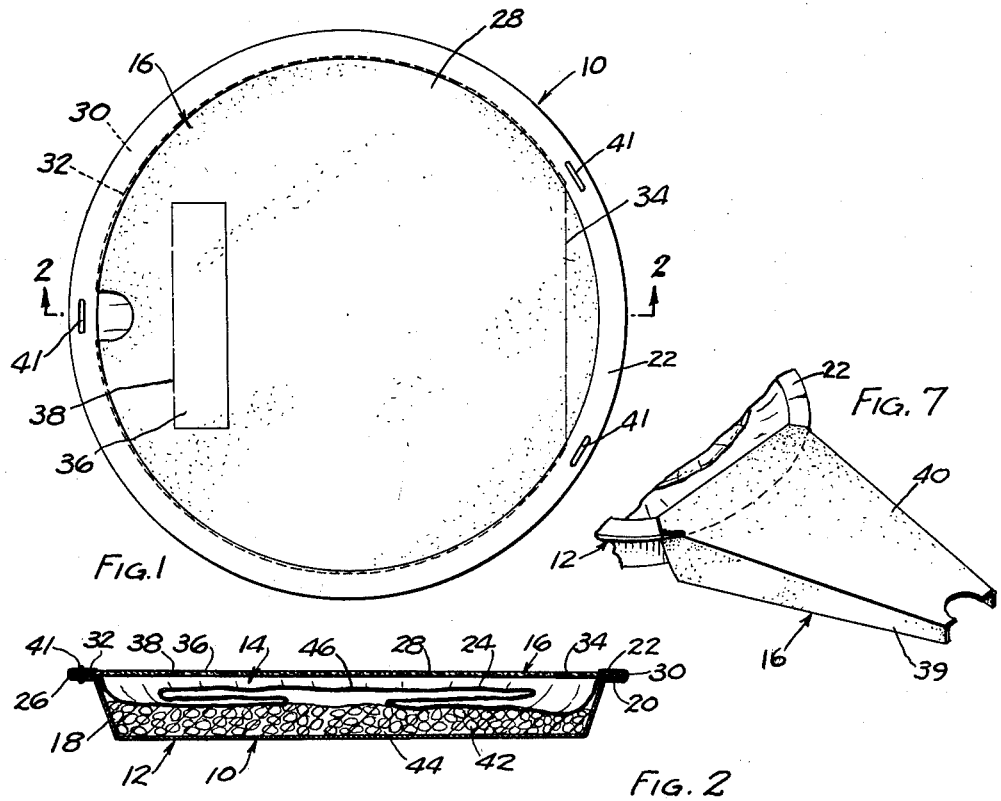
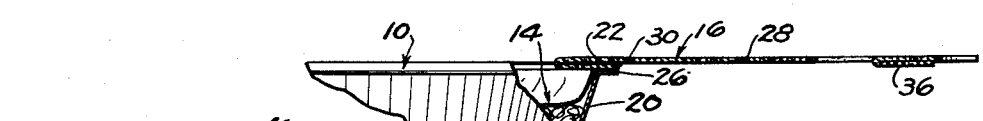
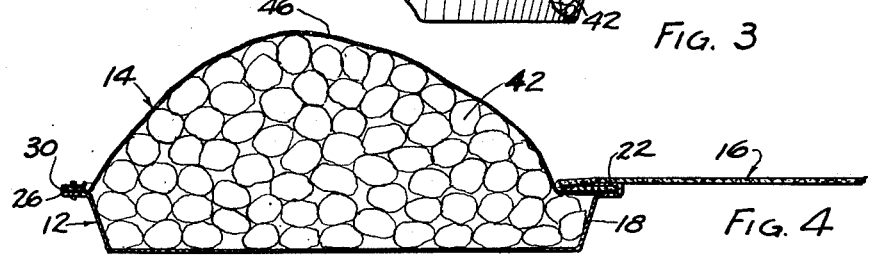
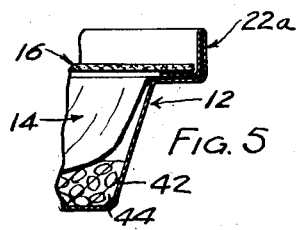
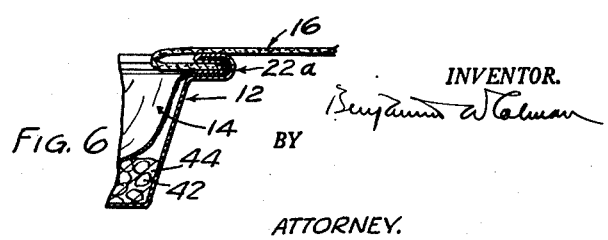
INVENTOR.
Benjamin W. Colman
BY
ATTORNEY.

Patented Mar. 30, 1954

2,673,806

UNITED STATES PATENT OFFICE 2,673,806

POPCORN PACKAGE

Benjamin W. Colman, Berkley, Mich., assignor, by mesne assignments, to Top-Pop Products Company, Detroit, Mich., a corporation of Michigan Application May 19, 1953, Serial No. 355,974

3 Claims. (Cl. 99—171)

This invention relates to a food package, and more particularly to a package for storing and cooking food therein made of aluminum foil or other metal embodying a cooking utensil and a cover arrangement which is simply and easily convertible into a handle for said utensil without removal of the cover from the utensil.

This invention and application is related to my co-pending application Serial No. 339,765, filed March 2, 1953, for Popcorn Package.

Although the invention has been developed for use with foods which are prepared by frying, it is to be clearly understood that the embodiments described are not limitations of the invention, but constitute merely examples of applications to which the invention may be put.

Aluminum foil is presently being used as a wrapping material for food, generally for frozen foods. The foil is also employed in some cases as the material in which the food is heated and cooked, and further the foil may be the serving plate itself, after cooking.

But these utilitarian features and applications of aluminum foil have a distinct limitation, in that the foil wrapper has no handle by which the package may be manipulated in cooking, an operation which is often necessary. And further, the foil is not designed as a cooking vessel and therefore has no cover for the food. The food is simply overwrapped in foil, and is placed in a warming or heating oven for cooking.

The invention hereindescribed provides a cooking vessel, a cover for the vessel which converts into a handle to make the vessel a manipulatable pan, and a subcover of thin aluminum foil for more directly covering the food at all times, both prior to and during the cooking operation.

It is an object of this invention to provide a food package of disposable, inexpensive aluminum foil having a handle cover embodied therein, for storing and preparing food.

Another object is to provide a cooking utensil package in which food may be stored, having a subcover of aluminum foil for the food and a second cover of paper which is embodied in the utensil and which folds back from the utensil to provide a handle for the same.

A further object is to provide a frying pan having an integrally arranged cover which converts into a handle.

Other features of the construction will become more apparent as the description of the invention unfolds below. For a visual understanding of the invention, reference may be had to the accompanying drawing made an integral part hereof, and in which Fig. 1 is a plan view of the invention, with its paper cover in normally closed position.

Fig. 2 is a vertical sectional view on the line 2—2 of Fig. 1, shown with popcorn and frying fat enclosed by the foil subcover.

Fig. 3 is a fragmentary vertical sectional view, similar to Fig. 2, showing the paper cover folded back to provide a handle.

Fig. 4 is a vertical sectional view of the inventive construction of Fig. 2, containing exploded popcorn.

Fig. 5 is a fragmentary vertical sectional view similar to the right side of Fig. 2, showing a modified construction in a preliminary forming step.

Fig. 6 is a view similar to Fig. 3, showing the modified construction of Fig. 5 in completed form.

Fig. 7 is a fragmentary perspective view showing a modified form of hand grip in the handle cover.

As seen in Figs. 1 and 2, the food package 10 consists of a vessel 12, a subcover 14, and a paper cover 16 embodied in vessel 12 and conjoined thereto.

Vessel 12 comprises a body portion 18 terminating at its upper peripheral edge in an outwardly directed flange 20 having an infolded rim portion 22. The vessel 12 is preferably made of aluminum foil which comes in varying thicknesses ranging from about .005 inch down to .0001 inch. Foil of about .0035 to .005 inch is considered suitable for vessel 12, although it is not limited to this range.

The subcover 14 consists of an infolded, pleated and/or tucked body portion 24 terminating at its peripheral edge in an outwardly projecting flange 26. Subcover flange 26 rests directly upon vessel flange 20. Whatever food is stored in the food package 10 rests between vessel body portion 18 and subcover body portion 24 which directly overlies it. In some instances, body portion 24 and flange 26 may be arranged substantially uniplanar by compressing the pleated body portion 24 upon itself. The folds, pleats or tucks (not shown) may take any of the forms well known in the art, which permit take up of the area of subcover body portion 24 in reducing the peripheral diameter at flange 26 to bring it within the confines of vessel flange and rim, 20, 22 respectively. By so doing, an inflatable subcover body portion 24 is provided that will contain a large volume of expandable food, such as popcorn, the volume of vessel 12 being small in relation to that contained by the inflated subcover body portion 24.

Subcover 14 is preferably made of aluminum foil thinner than that employed in vessel 12. One of the reasons for this is that a thinner foil provides ample protection for food storage, another that it is less expensive, and further, it provides a distensible, inflatable cover in which such a food as popcorn can be contained without requiring that the vessel 12 provide the entire volumetric chamber for the popped corn. Many foods expand when heated and cooked and it is desirable to provide a subcover for such foods which will expand, distend or inflate under the pressure of internal frying gases and steam, and at the same time contain the heat for and the juices of the food being cooked. It has been found that aluminum foil of the order of .0003 to .0005 inch in thickness is suitable for subcover 14, although it is not necessarily limited to that range.

The cover 16 is preferably made of paper, such as chip-board, corrugated paper, boxboard or kraft board. It comprises a central cover handle portion 28, an outer rim 30 integrally formed with central portion 28 and cut therefrom along annular line 32. A fold line 34 is die marked or scored in the cover 16, at which line central portion 28 will fold back from over vessel body 18 and project outwardly from it. A hand insertable cut out portion 36, folding on line 38, is arranged in central portion 28 to provide a place to insert the fingers and hand of the user converting the cover 16 into a handle for package 10. Cover central portion 28 may also be folded in a variety of ways to provide a grip means for the hand, in place of the cut out portion 36 as shown.

One of these forms is shown in Fig. 7, where the cover central portion 28 is die marked or scored to provide side flanges 39 which fold downwardly, forming an elongated grip handle 40. In this modification, the excess portions of the cover central portion 28 (not shown) are arranged to be cut and torn out so that a simple grip handle 40, comfortable to the hand and capable of properly manipulating the vessel 12 is achieved.

Cover rim 30 lies directly upon subcover flange 26. Vessel body rim portion 22 is folded and pressed down or rolled upon cover rim 30 to conjoin and seal the elements of package 10 into a unitary package. In some cases, subcover 14 may be dispensed with, and package 10 will then consist simply of vessel 12 and cover 16, which may be foil coated on its under side, or on both sides, for better food protection.

To firmly anchor the cover 16 in the vessel 12, wire staples 41 may be affixed through vessel rim portion 22, cover rim 30, subcover flange 26 and vessel flange 20, conjoining them together.

As an example of the use to which such a utensil food package may be put, unpopped corn 42 and a suitable frying fat 44, such as coconut oil, is contained in the bottom of vessel body 18. The thin foil subcover 14 is then placed directly over the popcorn and fat, and paper cover 16 is arranged over the subcover as above described. Small steam and gas exhaust vent openings 46 may be prepunctured in the foil subcover body 24. After turning down vessel rim portion 22 and stapling, the loaded food package 10 may be shipped, stored and handled easily and safely. Paper cover 16 protects the thin foil subcover 14 from damage, and provides a means for stacking the packages on top of each other.

The modification shown in Figs. 5 and 6 represents a double fold construction in which vessel flange and rim, 20 and 22 respectively, containing subcover flange 26 between them, is double folded over paper handle cover rim 30. This double fold provides a better, more secure seal for containing the food and fat within vessel 12, and prevents leaking to a very great extent. Paper cover rim 30 is held within the double fold, referred to generally as 22a, instead of resting directly upon subcover flange 26. However, it is to be understood that the double fold construction is a modification for use under circumstances where better sealing in is required.

When the popcorn package is to be used, the central cover portion 28 is folded back on line 34, and the user's fingers and hand are inserted in cut out portion 36, folding it back on line 38. Or in the case of the grip handle design of Fig. 7, the handle flanges 39 are turned down on their fold lines and the grip handle 40 is grasped in the palm of the hand. It will be noted that Figs. 1 and 2 indicate that the vessel rim 22 overlies the outer edge of cover foldable portion 28. This arrangement is a means simply of holding the cover portion 28 until the package is ready for use, when cover portion 28 is pulled back on fold line 34. In pulling cover portion 28 back, its edge will bear against the inturned edge of vessel rim 22 until it is free thereof. The light gage of metal used in vessel 12 is not sufficient to resist normal manual pressure pull on the cover portion 28. As a suitable alternative, a space may be provided between central cover portion 28 and cover rim 30 which will allow free movement upward of cover portion 28 without interference from vessel rim 22.

The vessel body 18 is placed directly upon the burner of a gas or electric range or upon an open outdoor fire (not shown). As the heat begins to melt the fat 44 and bring it to frying temperature, gases are generated which tend to inflate and distend the infolded, pleated subcover body portion 24, which together with the popped corn causes the subcover to assume the shape generally shown in Fig. 4, filling the chamber created by distended inflated subcover body portion 24 and vessel body 18.

Steam openings 46 may not always be necessary, but they are generally used where considerable internal pressure is developed, thus preventing premature rupture of the foil subcover 14.

Another reason for embodying paper cover 16 in vessel 12 as described is to provide a means for absorbing the vaporising liquid fat 44 which tends to seek a path out of vessel body 18 across flange 20 or out of double fold 22a. The paper cover rim 30 absorbs this fat, functioning much as a wick, and prevents it from running out of the vessel over rim 22 and down the outside of the vessel body 18 to start a grease fire.

In order to prevent burning of the popcorn 42, the vessel 12 is shaken by means of handle cover 16. Frequent shaking will prevent sticking and burning of the popcorn during the entire cooking operation. When the popping action ceases, the vessel 12 is removed from the heat by means of handle cover 16, the thin foil subcover 14 is ruptured by the fingers or an instrument and the popcorn 42, now in popped condition, is served directly from the package 10 or may be emptied into another serving bowl.

As suitable alternatives, tin coated steel may be used for vessel 12 instead of aluminum foil and a heat resistant plastic may be substituted for paper in cover 16. Also, paper handle cover 16 may have its rim 30 affixed directly over vessel rim 22 instead of under it. This would be useful and desirable—to reduce costs—where substantially solid foods are stored in package 10 for cooking. Although presently not now available, some plastic film material may be used for subcover 14 in place of the aluminum foil.

It will be apparent to those skilled in the art to which this invention pertains that various modifications and changes may be made without departing from the spirit of the invention or from the scope of the appended claims.

I claim:

1. A package of popcorn and in which said popcorn is prepared for consumption by cooking, comprising popcorn and a frying fat, a metallic cooking vessel, a compactly arranged, infolded, enclosing, inflatable metallic foil subcover over said popcorn and fat, and a cover arranged over said subcover, said vessel, subcover and cover being peripherally conjoined, said vessel and subcover enclosing and containing said popcorn in both uncooked and cooked conditions, said cover having a relatively narrow vessel-conjoined outer annular rim and a portion central of said rim adapted to be folded back into substantially the plane of said annular rim, projecting outwardly of said vessel as a handle for said cooking vessel, said subcover being substantially completely exposed and free to fully inflate upon folding back of said cover central portion, being inflatable from its compacted, infolded state upon cooking of said popcorn, and being adapted to contain said popcorn in its expanded condition.

2. A food package for storing food and in which said food is prepared for consumption by cooking, consisting of popcorn and a frying fat, a cooking vessel adapted to contain said popcorn and fat, a compacted, infolded, enclosing, inflatable subcover over said popcorn of light guage aluminum foil and a cover over said subcover peripherally conjoined to said vessel, said vessel and subcover being adapted to contain said popcorn in both uncooked and cooked conditions, said cover having a relatively narrow vessel-conjoined outer annular rim and a portion central of said rim and connected to said rim, projecting outwardly of said vessel as a handle for said cooking vessel, said subcover being substantially completely exposed and free to fully inflate upon folding back of said cover central portion, being inflatable from its compacted, infolded state upon cooking of said popcorn, and being adapted to contain said popcorn in its expanded state with said vessel.

3. A package of popcorn in which said popcorn is prepared for consumption by cooking, comprising popcorn and a frying fat, a cooking vessel adapted to contain said popcorn in its uncooked state, a compacted, infolded, enclosing, inflatable metallic foil subcover over said food and a cover arranged in covering position over said subcover, said vessel, subcover and cover being peripherally conjoined, said cover having a relatively narrow vessel-conjoined outer annular rim overlying the peripheral edge of said subcover and said vessel, and a portion central of said rim and connected to said rim adapted to be folded back from said rim into substantially the plane of said rim, projecting outwardly of said vessel as a handle for said cooking vessel, said subcover being substantially completely exposed and free to fully inflate upon folding back of said cover central portion and positioned below the plane of said annular rim prior to cooking of said popcorn, being inflatable from its compacted, infolded state upon cooking of said popcorn, and being inflatable and containing said popcorn in its expanded state together with said cooking vessel.

BENJAMIN W. COLMAN.

References Cited in the file of this patent

UNITED STATES PATENTS

| Number | Name | Date |
|---|---|---|
| 685,900 | Anderson | Nov. 5, 1901 |
| 1,514,379 | Fleischer | Nov. 4, 1924 |
| 2,293,589 | Calvert | Aug. 18, 1942 |
| 2,317,067 | Knaust | Apr. 20, 1943 |
| 2,369,765 | Waters | Feb. 20, 1945 |
| 2,528,251 | Spencer | Oct. 31, 1950 |